US006433075B1

(12) United States Patent
Davies et al.

(10) Patent No.: US 6,433,075 B1
(45) Date of Patent: Aug. 13, 2002

(54) SURFACTANT BASED GELLING COMPOSITION FOR WELLBORE SERVICE FLUIDS

(75) Inventors: Stephen N. Davies, Over; Timothy G. J. Jones, Cottenham; Gary J. Tustin, Cambridge, all of (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/647,274
(22) PCT Filed: Mar. 25, 1999
(86) PCT No.: PCT/GB99/00941
§ 371 (c)(1), (2), (4) Date: Nov. 20, 2000
(87) PCT Pub. No.: WO99/50529
PCT Pub. Date: Oct. 7, 1999

(30) Foreign Application Priority Data

Mar. 27, 1998 (GB) .............................................. 9806492

(51) Int. Cl.$^7$ .............................................. C08L 33/00
(52) U.S. Cl. ...................................... 524/815; 524/819
(58) Field of Search ................................. 524/815, 819

(56) References Cited

U.S. PATENT DOCUMENTS

| | | |
|---|---|---|
| 4,011,259 A | 3/1977 | Samour et al. |
| 4,049,608 A | 9/1977 | Steckler et al. |
| 4,064,091 A | 12/1977 | Samour et al. |
| 4,224,455 A | 9/1980 | Deutsch |
| 4,284,517 A | 8/1981 | Chen et al. |
| 4,317,893 A | 3/1982 | Chen et al. |
| 4,337,185 A | 6/1982 | Wessling et al. |
| 4,582,137 A | 4/1986 | Schmitt |
| 4,695,389 A | 9/1987 | Kubala |
| 4,721,161 A | 1/1988 | Richardson et al. |
| 4,725,372 A | 2/1988 | Teot et al. |
| 4,735,731 A | 4/1988 | Rose et al. |
| 5,021,526 A | 6/1991 | Ball |
| 5,039,433 A | 8/1991 | Sopko et al. |
| 5,162,475 A | 11/1992 | Tang et al. |
| 5,203,834 A | 4/1993 | Hutchins et al. |
| 5,258,137 A | 11/1993 | Bonekamp et al. |
| 5,551,516 A | 9/1996 | Norman et al. |

FOREIGN PATENT DOCUMENTS

| | | |
|---|---|---|
| GB | 2 260 353 A | 4/1993 |
| GB | 2 335 428 B | 3/2001 |

OTHER PUBLICATIONS

Gravsholt, S. Rheopectic behavior of highly dilute viscoelastic aqueous detergent solutions Naturwissenschaften, vol. 66, 1979, pp. 263–264.

Cates, M. E. and Candau, S. J. Statics and dynamics of worm–like surfactant micelles J. Phys. Condens. Matter, vol. 2, 1990, pp. 6869–6982.

Rehage, H. and Hoffman, H. Viscoelastic surfactant solutions: model systems for rheological research Molecular Physics, vol. 74, No. 5, 1991, pp. 933–973.

Rehage, H. Interesting correlations between the rheological properties of rod–shaped micelles and dye assemblies Structure and Flow in Surfactant Solutions, Herb, C. A. and Prud'homme, R. K. (eds.), ACS Symposium Ser. 578, American Chemical Society, Washington D.C., 1994, pp. 63–84.

Hoffmann, H., Thunig, C., Schmiedel, P. and Munkert, U. Gels from surfactant solutions with densely packed multi-lamellar vesicles Faraday Discuss., 101, 1995, pp. 319–333.

Guenet, J–M Thermoreversible gelatin of polymers and biopolymers Academic Press, New York, 1992, pp. 1–2.

Hoffman, H. and Ebert, G. Surfactants, micelles and fascinating phenomena Angew. Chem. Int. Ed. Engl., vol. 27, 1988, pp. 902–912.

Rose, G. D. and Teot, A. S. Viscoelastic surfactants: rheology control without polymers or particulates Structure and Flow in Surfactant Solutions, Herb, C. A. and Prud'homme, R. K. (eds.), ACS Symposium Ser. 578, American Chemical Society, Washington D.C., 1994, pp. 352–369.

Flory, P. J. Principles of Polymer Chemistry Cornell University Press, Ithaca, N.Y. 1953, pp. 203–217.

Odian, G. Emulsion polymerization Principles of Polymerization, $3^{rd}$ ed., Wiley N.Y., 1991, pp. 335–355.

Engorov, V. V. and Zubov, V. P. Radical polymerisation in the associated species of ionogenic surface–active monomers in water Russian Chemical Reviews, vol. 56(12), 1987, pp. 1153–1165.

Paleos, C. M. Polymerization of micelle–forming monomers Polymerization in Organized Media (C.M. Paleos, eds.), Gordon and Breach Science Publishers, Philadelphia, 1992, pp. 183–214.

Tauer, K. Reactive Surfactants Polymeric Dispersions: Principles and Applications, (J.M. Asua, ed.), NATO ASI Series E: Applied Sciences vol. 335, Kluwer, Dordrecht, 1997, pp 463–476.

Larrabee, C. E. and Sprague, E. D. Radiation–induced polymerization of sodium 10–undecenoate in aqueous micelle solutions J. Polymer Science, Polymer Letters. Ed., vol. 17, 1979, pp. 749–751.

Sprague, E. D., Duecker, D. C. and Larrabee, C. E. Association of spin–labeled substrate molecules with poly(sodium10–undecenoate) and the sodium 10–undecenoate micelle J. American Chem. Soc., vol. 103, 1981, pp. 6797–6800.

(List continued on next page.)

Primary Examiner—Helen L. Pezzuto
(74) Attorney, Agent, or Firm—Thomas O. Mitchell; Brigitte L. Jeffery; John J. Ryberg

(57) ABSTRACT

A composition, in particular a wellbore service fluid, comprising monomeric surfactants, preferably viscoelastic surfactants, in combination with a polymerization agent. Additionally, the fluid may contain a cross-linking agent to cross-link the polymerized surfactants.

13 Claims, No Drawings

OTHER PUBLICATIONS

Paleos, C. M., Stassinopoulou, C. I. and Malliaris, A. Comparative studies between monomeric and polymeric sodium 10–undecenoate micelles J. Phy. Chem., vol. 87, 1983, pp. 251–254.

Durairaj, B. and Blum, F. D. Synthesis and characterization of oligomeric micelles of sodium carboxylates Polymer Preprints, vol. 26(1), 1985, pp. 239–240.

Arai, K., Maseki, Y. and Ogiwara, Y. Behavior of poly(sodium 10–undecenoate) as surfactant Makromol. Chem. Rapid Commun., vol. 8, 1987, pp. 563–567.

Gambogi, R. J. and Blum, F. D. Dynamics of micellar oligomeric and monomeric sodium 10–undecenoate J. Colloid and Interface Sci., vol. 140(2), 1990, pp. 525–534.

Yeoh, K. W. Chew, C. H. Gan, L. M. and Koh, L. L. Micellar polymerization of surfactants. Sodium 6–acrylamidocaproate and sodium 11–(N–methyl acrylamido) undecanoate Polymer Bulletin, vol. 22, 1989, pp. 123–129.

Yeoh, K. W., Chew, C. H., Gan, L. M., Koh, L. L. and Teo, H. H. Synthesis and polymerization of surface–active sodium acrylamidoundecanoate J. Macromol. Sci. Chem., vol. A26(4), 1989, pp. 663–680.

Yeoh, K. W., Chew, C. H., Gan, L. M., Koh, L. L. and Ng, S. C. Copolymerization of sodium 11–acrylamidoundecanoate with acrylamide and the solution properties of the copolymers J. Macromol. Sci. Chem., vol. A27(6), 1990, pp. 711–724.

Paleos, C. M., Dais, P. and Malliaris, A. Polymerization of allyldimethyldodecylammonium bromide in micellar and isotropic media J. Polymer Science, Polymer Chemistry . Ed., vol. 22, 1984, pp. 3383–3391.

Nagai, K. Ohishi, Y. Inaba, H. and Kudo, S. Polymerization of surface–active monomers. I. Micellization and polymerization of higher alkyl salts of dimethylaminoethyl methacrylate J. Polymer Science, Polymer Chemistry. Ed., vol. 23, 1985, pp. 1221–1230.

Nagai, K. Ohishi, Y. Polymerization of surface–active monomers. II. Polymerization of quarternary alkyl salts of dimethylaminoethyl methacrylate with a different alkyl chain length J. Polymer Science, Polymer Chemistry, vol. 25, 1987, pp. 1–14.

Lerebours, B., Perly, B. and Pileni, M. P. Polymerization of cetyltrimethylammonium methacrylate micellar solution Chemical Physics Letters, vol. 147, No. 5, 1988, pp. 503–508.

Gast, A. P. Polymeric micelles Current Opinion in Colloid & Interface Sci., vol. 2, 1997, pp. 258–263.

Buitenhuis, J. and Förster, S. Block copolymer micelles: viscoelasticity and interaction potential of soft spheres J. Chem. Phys., vol. 107(1), 1997, pp. 262–272.

Strauss, U. P. Hydrophobic polyelectrolytes Polymers in Aqueous Media (J.E. Glass, ed.), Adv. Chem. Ser., vol. 223, American Chemical Society, Washington D.C., 1989, pp. 317–324.

Wang, T. K., Iliopoulos, I. and Audebert, R. Aqueous–solution behavior of hydrophobically modified poly(acrylic acid) Water Soluble Polymers: Synthesis, Solution Properties and Applications (S.W. Shalaby, C.L. McCormick and G. B. Butler, eds.), ACS Symp. Ser., vol. 467, American Chemical Soc., Washington D.C., 1991, pp. 218–231.

Schulz, D. N., Bock, J. and Valint, P. L. Synthesis and characterization of hydrophobically associating water–soluble polymers Macromolecular Complexes in Chemistry and Biology (P. Dubin, J. Bock, R. Davis, D.N. Schulz and C. Thies, eds.), Spring–Verlag, Berlin, 1994, pp. 3–13.

Selb, J., Biggs, S., Renoux, D. and Candau, F. Hydrophobic and electrostatic interactions in water–soluble associating copolymers Hydrophilic Polymers (J.E. Glass, ed.), Adv. Chem. Ser. vol. 248, American Chemical Soc., Washington D.C., 1996, pp. 251–278.

Tuzar, Z. and Kratochvil, P. Micelles of block and graft copolymers in solutions Surface and Colloid Science, vol. 15 (E. Matijevic, ed.), Plenum Press, New York, 1993, pp. 1–83.

Chu, B. Structure and dynamics of block copolymer colloids Langmuir, vol. 11, 1995, pp. 414–421.

Liu, G., Smith, C. K., Hu, N. and Tao, J. Formation and properties of polystyrene–block–poly (2–hydroxyethyl methacrylate) micelles Macromolecules, vol. 29, 1996, pp. 220–227.

Guenoun, P., Davis, H. T., Tirrell, M. and Mays, J. W. Aqueous micellar solutions of hydrophobically modified polyelectrolytes Macromolecules, vol. 29, 1996, pp. 3965–3969.

Roovers, J. Concentration dependence of the relative viscosity of star polymers Macromolecules, vol. 27, 1994, pp. 5359–5364.

McConnell, G. A. and Gast, A. P. Melting of ordered arrays and shape transitions in highly concentrated diblock copolymer solutions Macromolecules, vol. 30, 1997, pp. 435–444.

Biggs, S., Hill, A., Selb, J. and Candau, F. Copolymerization of acrylamide and a hydrophobic monomer in an aqueous micellar medium: effect of the surfactant on the copolymer microstrucutre J. Phys. Chem., vol. 96, 1992, pp. 1505–1511.

Wang, G–J and Engberts, J. B. F. N. Synthesis and catalytic properties of hydrophobically modified poly(alkylmethyldiallylammonium chlorides) Eur. Polym. J., vol. 31, No. 5, 1995, pp. 409–417.

Sarrazin–Cartalas, A., Iliopoulos, I., Audebert, R. and Olsson, U. Association and thermal gelation in mixtures of hydrophobically modified polyelectrolytes and nonionic surfactants Langmuir, vol. 10, 1994, pp. 1421–1426.

Lindman, B. and Thalberg, K. Polymer–surfactant interactions—recent developments Interactions of Surfactants with Polymers and Proteins, E. D. Goddard and K. P. Ananthapadmanabhan (eds.). CRC Press, Boca Raton, Florida, 1993, pp. 203–276.

March, J. Oxidations and reductions Advanced Organic Chemistry, $4^{th}$ edition, Wiley, New York, 1992, pp. 1177–1178.

Barnes, H. A., Eastwood, A. R. and Yates, B. A comparison of the rheology of two polymeric and two micellar systems. Part I: Characterization and model–fitting Rheol. Acta 14, 1975, pp. 53–60.

Gravsholt, S. Viscoelasticity in highly dilute aqueous solutions of pure cationic detergents Journal of Colloid and Interface Science, vol. 57, No. 3, 1976, pp. 575–577.

SURFACTANT BASED GELLING COMPOSITION FOR WELLBORE SERVICE FLUIDS

The present invention relates to surfactant, particularly viscoelastic surfactant based gelling compositions preferably used for wellbore service fluids. More particularly it relates to such compositions for selectively reducing the flow of subterranean aqueous fluids into a well while maintaining the hydrocarbon production.

BACKGROUND OF THE INVENTION

Various types of wellbore fluids are used in operations related to the development, completion, and production of natural hydrocarbon reservoirs. The operations include fracturing subterranean formations, modifying the permeability of subterranean formations, or sand control. Other applications comprise the placement of a chemical plug to isolate zones or complement an isolating operation. The fluids employed by those operations are known as drilling fluids, completion fluids, work over fluids, packer fluids, fracturing fluids, conformance or permeability control fluids and the like.

Of particular interest with regard to the present inventions are fluids for water control applications: During the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

In many cases, a principal component of wellbore service fluids are gelling compositions, usually based on polymers or viscoelastic surfactants.

There has been considerable interest in the viscoelastic gels formed from the solutions of certain surfactants when the concentration significantly exceeds the critical micelle concentration. Viscoelastic surfactant solutions are usually formed by the addition of certain reagents to concentrated solutions of surfactants, which most frequently consist of long-chain quaternary ammonium salts such as cetyltrimethylammonium bromide (CTAB). Common reagents which generate viscoelasticity in the surfactant solutions are salts such sodium salicylate and sodium isocyanate and non-ionic organic molecules such as chloroform. The electrolyte content of surfactant solutions is also an important control on their viscoelastic behaviour. The viscoelastic properties of a solution arises from the formation of long cylindrical (or "worm-like") micelles and their entanglement to form a three-dimensional structure. The surfactant micelles behave in a manner somewhat similar to polymer chains, although the former are dynamic entities with the surfactant monomers constantly joining and leaving the micelles. The micelles are held together by van der Waals (and other similar) interactions, in contrast to the strong covalent bonds between monomer units in polymers. The surfactant micelles are fragile (4) and the gels formed by the entangled micelles are relatively weak. Such gels are often termed physical gels (6), in contrast to chemical gels which are commonly formed by the cross-linking of high molecular weight polymers using covalent or ionic bonds.

Further references related to the use of viscoelastic surfactants as wellbore service fluids can be found for example in U.S. Pat. No. 4,695,389, U.S. Pat. No. 4,725,372, U.S. Pat. No. 5,258,137 and U.S. Pat. No. 5,551,516.

Several patents have described the use of polymerizable surfactants in emulsion polymerizatio. In U.S. Pat. No. 5,162,475, there is described the use of $\alpha$-$\beta$ (i.e., terminal) ethylenically unsaturated poly(alkyleneoxy) compounds which act as the surfactant in the emulsion polymerization process and which co polymerize with the non-surfactant monomers. Several earlier patents, U.S. Pat. No. 4,049,608, 4,224,455 and 4,337,185 have also described the co-polymerization of the surfactant monomers used in emulsion polymerization processes. In U.S. Pat. No. 4,064,091 there is described the use of unsaturated quaternary ammonium salts as surfactants in emulsion polymerization processes which co-polymerize with the non-surfactant monomers to produce self-stabilising polymeric dispersions which are free of surfactant monomers.

Most recent work by K. Tauer, published in "Polymeric Dispersions: Principles and Applications" (J. M. Asua ed.), NATO ASI Series E: Applied Sciences Vol. 335, 1997 describes the polymerization of surfactant-like monomers in small micelles in the absence of other surfactants.

The object of this present invention is to provide improved compositions, especially or wellbore service fluids, based on monomeric surfactants, particularly monomeric viscoelastic surfactants. It is a specific object of the invention to provide stable gels using such compositions. It is a further specific object of the invention to provide such compositions for water control operations in hydrocarbon wells.

SUMMARY OF THE INVENTION

The objects of the invention are achieved by polymerizing monomeric surfactants forming micelles in an aqueous solution.

Herein, monomeric is defined as having no repetitive units. Preferably, the molecular mass of monomeric surfactants is less than 10000, preferably less than 1000 units.

Surfactants are water soluble surface-active materials with a hydrophobic group. The solubility in water is controlled by a hydrophilic group. Surfactants are usually classified according to their electrochemical properties as anionic, cationic or non-ionic agents. Often they are referred to as detergents, soaps or amphiphilic compounds.

In solution (and above a critical concentration) surfactants form micelles. The concentration of the surfactants is sufficient to transform the solution into a gel. Preferably, the concentration lies in the range of 1 to 10 weight per cent.

In a preferred embodiment of the invention the momomeric surfactant belong to the class of surfactant which display in solution viscoelastic behavior.

The polymerizing agent is capable of initiating a polymerization of the surfactants forming a micelle, thus stabilizing the gel.

The concentration of the agent is preferably in the range of 10 to 1000 ppm (parts per million)

As applied to solutions, the term "viscoelastic" means a viscous solution which at least partially returns to its original state when an applied stress is released. The property of viscoelasticity can be tested for example by observing whether bubbles created by swirling the sample recoil after the swirling ceased. For this and other test reference is made to H. A. Barnes et al. Rheol. Acta. 14 (1975), pp. 53–60 and S. Gravsholt, Journal of Coll. and Interface Sci. 57(3), 1976, pp.575–6.

The physical gels formed by viscoelastic surfactant solutions can exhibit considerable responsiveness to their external chemical and physical environments. For example, the viscoelasticity of these concentrated surfactant solutions can be destroyed by contact with hydrocarbons and other organic liquids. The viscoelasticity of the solutions can also be lost on heating but recovered on cooling. However, once polymerized, the polymeric gels formed show significantly less responsiveness to their chemical and physical environment. Viscoelastic surfactants employed by the current invention are described for example in the above cited U.S. Pat. No. 4,695,389, U.S. Pat. No. 4,725,372, and U.S. Pat. No. 5,551,516 and literature referred to therein.

In a further preferred embodiment of the invention, the polymerized surfactants are cross-linked, thus further enhancing the stability of the gel. The preferred concentration of the cross-linking agent in the solution lies in the range of 10 to 1000 ppm.

Chemical cross-linking is defined as forming a chemical bond between the cross-linked molecules. Chemical cross-linking is understood to be stable and irreversible.

The cross-linking agents can be either inorganic ions (or ionic complexes) or polar organic molecules. When the polymer contains ionic groups such as carboxylate or sulphonate functions the polymer chains can be cross-linked by inorganic ions such as chromium(III) or zirconium(IV), frequently in the presence of monomeric ligands, such as acetate or adipate ions, to control the rate of cross-linking. Alternatively, organic cross-linking agents, such as hexanal or heptanal, can be used.

These and other features of the invention, preferred embodiments and variants thereof, and further advantages of the invention will become appreciated and understood by those skilled in the art from the detailed description following below.

MODE(S) FOR CARRYING OUT THE INVENTION

The polymerization and cross-linking of the cylindrical micelles in viscoelastic surfactant solutions is illustrated with three examples. The polymerization in the three examples is achieved by a free radical mechanism. However, it is stressed that the polymerization of the surfactant monomers to form polymeric surfactants can be achieved by a number of well known methods, including ring-opening polymerization, cation polymerization and anionic polymerization techniques. A description of these and other polymerization techniques has been given by G. Odian in: "Principles of Polymerization", 3rd ed., pp., Wiley, N.Y. (1991).

EXAMPLE 1

The first example is the polymerization of the surfactant N-erucyl-N,N-bis(2-hydroxyethyl)-N-methylammonium chloride

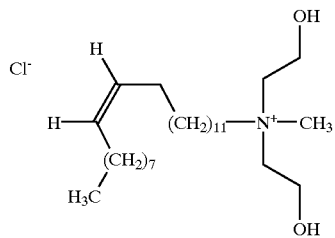

in an aqueous solution. The polymerization of the surfactant molecules is achieved by joining the carbon-carbon double bonds by a free radical polymerization reaction within the micelles using the following processes.

A viscoelastic surfactant solution was produced using 30 g/l of the surfactant N-erucyl-N,N-bis(2-hydroxyethyl)-N-methylammonium chloride with 40 g/l ammonium chloride. A volume of 100 ml of the viscoelastic surfactant solution was placed in a bottle which was purged with dry nitrogen gas to remove any dissolved oxygen. After sufficient purging 10 mg of the free radical initiator 2,2'-azo(bis-amidinopropane)dihydrochloride was added to the viscoelastic surfactant solution and mixed thoroughly.

The surfactant solution was heated at 60° C. for 24 hours under an atmosphere of nitrogen. Polmerization of the surfactant monomers in giant micelles resulted in the viscosity of the gel becoming insensitive to contact with hydrocarbon. The viscosity of the surfactant gel was not altered by polymerization of the surfactant monomers. The polymerized surfactant gel retained its gel strength after prolonged contact with water.

EXAMPLE 2

The second example is the polymerization of the viscoelastic surfactant solution formed by potassium oleate in a potassium chloride electrolyte solution:

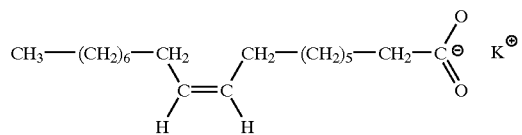

The viscoelastic surfactant solution was formed by mixing 60 g/l potassium oleate with 60 g/l potassium chloride. A sample of 100 ml of the viscoelastic surfactant solution was purged with nitrogen and mixed with 10 mg of the initiator 2,2'-azo(bisamidinopropane)dihydrochloride. The solution was heated at 60° C. for 24 hours under an atmosphere of nitrogen. The resulting solution of polymerized surfactants was slightly less viscoelastic than the original monomeric solution but the observed viscoelasticity was insensitive to contact with hydrocarbon. The gel formed by the polymerized surfactant retained its viscoelasticity after prolonged contact with water

EXAMPLE 3

The third example is the polymerization of a long-chain vinyl surfactant, the potassium salt of 10,17-octadecyldienoic acid

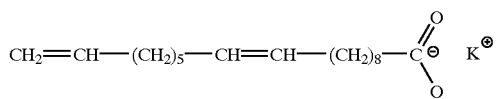

in a viscoelastic solution. The surfactant monomer is synthesized by a two stage reaction which involves coupling of the short-chain vinyl surfactant 10-undecenoic acid to 8-bromo-1-octene. The first stage consists of reacting the 10-undecenoic acid with ozone in dichloromethane followed by treatment with dimethyl sulphide (DMS) at −78° C. to convert the carbon-carbon double bond to a terminal aldehyde group by the so-called oxo-uncoupling reaction. The second stage consists of reacting the 8-bromo-1-octene with triphenylphosphine in dichloromethane to form 8-triphenylphosphonium-1-octene bromide which is then coupled with the aldehyde carboxylic acid and butyllithium in tetrahydrofuran by the Wittig reaction to form the surfactant monomer as shown above.

The potassium salt of 10,17-octadecyldienoic acid forms a viscoelastic surfactant solution at a concentration of 60 g/l in the presence of 40 g/l ammonium chloride. The surfactant monomers were polymerized using 10 mg of the free radical initiator 2,2'-azo(bis-amidinopropane)dihydrochloride in 100 ml of viscoelastic surfactant solution which had been purged with nitrogen gas. The solution was heated at 60° C. for 24 hours under an atmosphere of nitrogen.

Polymerization of the surfactant resulted in a rigid gel which retained the viscoelasticity of the original (monomeric) surfactant solution but showed none of its sensitivity to contact with hydrocarbon or water.

In all three of the examples given above it is possible to cross-link the polymeric micelles to increase the gel strength and to reduce further any sensitivity of the gel to its chemical and physical environment. The carboxylated polymers shown in the three above examples can be cross-linked using a polyvalent metal ion, such as chromium(III) or zirconium (IV) ions. Similarly, if the terminal carboxylate groups are replaced by sulphonate groups, then the polymerized micelles can also be cross-linked with metal ions such as zirconium(IV). Alternatively, the original viscoelastic surfactant solution can be composed of two different types of surfactant monomer which form mixed cylindrical micelles. The second surfactant monomer can be chosen to give a required cross-linking functionality to the polymerized micelle. For example, a viscoelastic surfactant solution can be formed with 10,17-octadecyldienoic acid and its amide 10,17-octadecyldienamide added in the mole fraction ratio of approximately 0.98:0.02. The two surfactants can be polymerized, as in example 3 given above, to yield a co-polymerized micelle. The amide groups within the polymerized micelles can be used to cross-link them with organic cross-linking agents such as formaldehyde and phenol. The high concentration of surfactant in the aqueous solution can be used to solubilise otherwise insoluble long-chain cross-linking agents such as hexanal or octanal. Other cross-linking functional groups can be envisaged.

What is claimed is:

1. A wellbore service fluid comprising an aqueous solution of monomeric surfactants and a polymerization agent, wherein said monomeric surfactants are viscoelastic and said polymerization agent is capable of polymerizing said monomeric viscoelastic surfactants under subterranean conditions.

2. The fluid of claim 1, wherein the polymerization agent is a radical, a cationic, or an anionic initiator.

3. The fluid of claim 1 wherein the concentration of the monomeric viscoelastic surfactants is sufficient to form micelles.

4. The fluid of claim 1 wherein the concentration of the monomeric viscoelastic surfactants is between 1 and 10 weight per cent.

5. The fluid of claim 1 wherein the monomeric viscoelastic surfactants form a gel.

6. The fluid of claim 1, further comprising a cross-linking agent.

7. Method of forming and stabilizing a gel comprising the steps of preparing and an aqueous solution of monomeric viscoelastic surfactants;

adding to said solution a polymerization agent;

injecting said solution into a subterranean wellbore; and letting said surfactants polymerize in the presence of said polymerization agent.

8. The method of claim 7, further comprising the steps of adding a cross-linking agent to the solution; and crosslinking the polymerized surfactants.

9. The fluid of claim 1 wherein said fluid is a viscoelastic gel before polymerization of the monomeric viscoelastic surfactants by the polymerization agent and said fluid is a viscoelastic gel after polymerization of said monomeric viscoelastic surfactants by said polymerization agent.

10. The fluid of claim 9 wherein the gel before polymerization of the monomeric surfactants by the polymerization agent is responsive to hydrocarbons and the gel after polymerization of said monomeric viscoelastic surfactant by said polymerization agent displays a lower responsiveness to hydrocarbons than said gel before polymerization of the monomeric surfactants by the polymerization agent.

11. The fluid of claim 9 wherein the gel after polymerization of the viscoelastic monomeric surfactants by the polymerization agent displays an improved resistance to the temperature as compared to the gel before polymerization of the viscoelastic monomeric surfactants by the polymerization agent.

12. The fluid of claim 3 wherein the concentration of the monomeric viscoelastic surfactants is sufficient to form entangled worm-like micelles.

13. A wellbore service fluid comprising an aqueous solution of viscoelastic surfactants and a polymerization agent, said polymerization agent being capable of polymerizing said viscoelastic surfactants under subterranean conditions, said fluid forming a viscoelastic gel before polymerization of the viscoelastic surfactants by the polymerization agent and forming a viscoelastic gel after polymerization of said viscoelastic surfactants by said polymerization agent.

* * * * *